(12) United States Patent
Takeuchi et al.

(10) Patent No.: US 7,103,422 B2
(45) Date of Patent: Sep. 5, 2006

(54) SAFETY NETWORK SYSTEM

(75) Inventors: Hisashi Takeuchi, Kyoto (JP); Satoru Shimokawa, Ohtsu (JP); Noboru Kawaike, Kyoto (JP)

(73) Assignee: Omron Corporation, Kyoto (JP)

( * ) Notice: Subject to any disclaimer, the term of this patent is extended or adjusted under 35 U.S.C. 154(b) by 273 days.

(21) Appl. No.: 10/479,542

(22) PCT Filed: Jun. 6, 2002

(86) PCT No.: PCT/JP02/05603

§ 371 (c)(1),
(2), (4) Date: Jun. 2, 2004

(87) PCT Pub. No.: WO02/101475

PCT Pub. Date: Dec. 19, 2002

(65) Prior Publication Data

US 2004/0210322 A1 Oct. 21, 2004

(30) Foreign Application Priority Data

Jun. 8, 2001 (JP) .............................. 2001-174770

(51) Int. Cl.
*G05B 11/01* (2006.01)
(52) U.S. Cl. .............................. 700/21; 700/3; 700/79; 700/9; 709/208
(58) Field of Classification Search .................. 700/21, 700/3, 9, 12, 26, 79, 80, 81, 82, 27; 709/208, 709/209–211

See application file for complete search history.

(56) References Cited

U.S. PATENT DOCUMENTS 5,369,569 A * 11/1994 Maeda et al. ................. 700/79
5,566,092 A * 10/1996 Wang et al. ................. 702/185
5,984,504 A * 11/1999 Doyle et al. ................. 700/108
6,577,918 B1 * 6/2003 Roth ........................... 700/177
6,647,735 B1 * 11/2003 Street et al. ................... 62/132
6,999,996 B1 * 2/2006 Sunderland ................. 709/208

FOREIGN PATENT DOCUMENTS

| JP | 8-202435 A | 8/1996 |
|---|---|---|
| JP | 9-161181 A | 6/1997 |
| JP | 10-271572 A | 10/1998 |
| JP | 11-219214 A | 8/1999 |
| JP | 2000-311014 A | 11/2000 |

(Continued)

*Primary Examiner*—Anthony Knight
*Assistant Examiner*—Thomas Pham
(74) *Attorney, Agent, or Firm*—Foley & Lardner LLP

(57) ABSTRACT

A network master (M) having charge of an operation of a main device (L) and one or more network slaves (S1 to S3) each having charge of a safety determining device (A to C) for determining safety which is an operating permission condition of the main device (L) are connected on the network. Each network slave comprises means for selectively performing a first operation for transmitting information including data for maintenance of the safety determining device or both determination output of the safety determining device and data for maintenance of the safety determining device, to the network master and a second operation for transmitting information including the determination output of the safety determining device but not including the data for maintenance of the safety determining device at all or hardly including it to the network master. The first operation in the network slave is performed when the main device is in a stopped state and the second operation in the network slave is performed when the main device is in an operating state.

13 Claims, 10 Drawing Sheets

FOREIGN PATENT DOCUMENTS

| | | |
|---|---|---|
| JP | 2001-34326 A | 2/2001 |
| JP | 200156890 A | 2/2001 |

\* cited by examiner

Daisy chain connection

Loop connection

Tree connection

SAFETY NETWORK SYSTEM

This application is a National Stage application of PCT/JP02/05603, filed Jun. 6, 2002, which claims priority from Japanese patent application 2001-174770, filed Jun. 8, 2001. The entire contents of each of the aforementioned applications are incorporated herein by reference.

BACKGROUND OF THE INVENTION

1. Field of the Invention

The present invention relates to a safety network system for organically connecting a main device such as a machine tool or the like in which operation safety measure is required, to a plurality of safety determining devices such as safety light curtains or the like which determine an operation safety condition or the like, and more particularly, it relates to a safety network system having high reliability in which aged deterioration of a safety determining device itself or the like can be appropriately managed without lowering responsibility of stopping a main device when a danger condition occurs.

2. Description of the Prior Art

In a case where a system having a main device such as a machine tool or the like in which operation safety measure is required and a plurality of safety determining devices such as safety light curtains or the like which determine an operation safety condition or the like is designed, when a network is intervened between those system components and a signal is transmitted or received by communication, the degree of design freedom of the system is improved as compared with a case where those components are directly connected without the network.

More specifically, a network master having charge of an operation of a main device and one or more network slaves having charge of a safety determining device for determining safety which is an operating permission condition of the main device are connected on the network. The network master comprises means for monitoring a determination output of each safety determining device through reception information from each network slave, and stopping the operation of the main device when danger is recognized based on the determination output of the safety determining device. Therefore, any safety determining device determines danger (a human body intrudes in an operation region of the main device or the like), the information (danger/safety) to the effect that is immediately transmitted from the network slave to the network master, and the main device is switched from an operating state to a stopped state by action of the network master.

In order to improve safety of the system, reliability of the safety determining device itself has to be secured. As the safety determining device, there are a safety light curtain, a safety door switch, a safety limit switch and the like. Since aged deterioration occurs in various kinds of transducers such as an output relay, a light emitting element, a light receiving element, a magnetic element and the like contained in the safety determining device, when the operation hours (or energized hours) or the number of operations reaches a predetermined value, the main device is stopped and maintenance such as exchange, repair and check is needed.

In order to appropriately manage a maintenance time of the safety determining device, it is necessary to know an operating condition of the safety determining device which is under the charge of each network slave, on the side of the network master. Therefore, it is necessary that the network slave inform the network master of data for maintenance (data for determining necessity of maintenance) such as the number of on-off times of an output, energized hours, record of malfunction detection and the like of each safety determining device.

When both on/off data (referred to as safety check data hereinafter) which shows whether the output from the safety determining device is safe or dangerous and data for maintenance are constantly transmitted from each network slave to the network master, the operating condition of each safety determining device can be constantly and accurately understood on the side of the network master.

However, since the amount of communication data is increased as the whole of the system, transmission of the safety check data is delayed and when any safety determining device detects human body intrusion or the like and outputs danger determination, response time while the main device is switched from the operating state to the stopped state is lowered.

SUMMARY OF THE INVENTION

The present invention was made to solve the above problems and it is an object of the present invention not to lower the response time while the main device is switched from the operating state to the stopped state when any safety determining device detects human body intrusion or the like and produces danger determination output, and to accurately recognize the fact that maintenance is necessary in the safety determining device which is under the charge of each network slave, on the side of the network master.

Another object of the present invention can be easily understood by those skilled in the art with reference to the following description in the specification.

A safety network system according to the present invention comprises a network master having charge of an operation of a main device, and one or more network slaves each having charge of a safety determining device for determining safety which is an operating permission condition of the main device, which are connected on the network.

The network master comprises means for monitoring a determination output of each safety determining device through reception information from each network slave, and stopping the operation of the main device when danger is recognized based on the determination output of the safety determining device, and means for monitoring data for maintenance of each safety determining device through reception information from each network slave, and producing an output to the effect that necessity of maintenance is recognized in any safety determining device based on the data for maintenance of the safety determining devices.

Each network slave comprises means for selectively performing a first operation for transmitting information including the data for maintenance of the safety determining device or both determination output of the safety determining device and data for maintenance of the safety determining device to the network master and a second operation for transmitting information including the determination output of the safety determining device but not including the data for maintenance of the safety determining device at all or hardly including it to the network master.

In addition, the terms of "hardly including" means that intermittent or cyclic interfusion of the data for maintenance can be permitted as long as the transmission of the determination output data when the danger is generated is not disturbed from a probabilistic point of view.

Furthermore, the first operation in the network slave is performed when the main device is in a stopped state and the second operation in the network slave is performed when the main device is in an operating state.

According to the above constitution, since the first operation for transmitting the information including the data for maintenance of the safety determining device or both determination output (safety check data) of the safety determining device and data for maintenance of the safety determining device to the network master is performed when the main device is in a stopped state, even if danger determination is output due to human intrusion detection or the like in any safety determining device, the transmission delay does not matter and also it does not matter even if the danger determination is not output to the network master because the main device is stopped at that time. Meanwhile, regarding the content of the data for maintenance, since its change may be monitored by the several hours, the half day or the one day at most in many cases, it does not matter if the data for maintenance is obtained only when the main device is in the stopped state.

A safety network system according to another aspect of the present invention comprises a network master having charge of an operation of a main device and one or more network slaves each having charge of a safety determining device for determining safety which is an operating permission condition of the main device, which are connected on the network.

The network master comprises means for monitoring a determination output of each safety determining device through reception information from each network slave, and stopping the operation of the main device when danger is recognized based on the determination outputs of the safety determining device, and means for monitoring data for maintenance of each safety determining device through reception information from each network slave, and producing an output to the effect that necessity of maintenance is recognized in any safety determining device based on the data for maintenance of the safety determining devices.

Each network slave comprises means for selectively performing a first operation for transmitting information including the data for maintenance of the safety determining device or both determination output of the safety determining device and data for maintenance of the safety determining device to the network master, and a second operation for transmitting information including the determination output of the safety determining device but not including the data for maintenance of the safety determining device at all or hardly including it to the network master.

Furthermore, selection between the first operation and second operation in each network slave is controlled depending on the content of a transmission request command sent from the network master. According to the above constitution, the network master takes the initiative and switches the content of the transmission data on the side of the network slave.

According to a preferred embodiment of the present invention, the network master may transmit the transmission request command corresponding to the second operation to each network slave when the main device is in an operating state, and transmit the transmission request command corresponding to the first operation to each network slave when the main device is in a stopped state.

According to the above constitution, since the data for maintenance is transmitted only when the network master recognizes the stopped state of the main device, a switching delay from the operating state to the stopped state of the main device caused by a transmission delay of the danger determination output data can be surely avoided.

A network master according to still another aspect of the present invention is used in a safety network system comprising a network master having charge of an operation of a main device and one or more network slaves each having charge of a safety determining device for determining safety which is an operating permission condition of the main device, which are connected on the network.

The network master comprises means for monitoring a determination output of each safety determining device through reception information from each network slave, and stopping the operation of the main device when danger is recognized based on the determination output of the safety determining device and means for monitoring data for maintenance of each safety determining device through reception information from each network slave, and producing an output to the effect that necessity of maintenance is recognized in any safety determining device based on the data for maintenance of the safety determining device, and means for transmitting a transmission request command corresponding to a first operation for transmitting information including the data for maintenance of the safety determining device or both determination output of the safety determining device and data for maintenance of the safety determining device to each network slave when the main device is in a stopped state, and transmitting a transmission request command corresponding to a second operation for transmitting information including the determination output of the safety determining device but not including the data for maintenance of the safety determining device at all or hardly including it to each network slave when the main device is in an operating state.

A network slave according to still another aspect of the present invention is used in a safety network system comprising a network master having charge of an operation of a main device and one or more network slaves each having charge of a safety determining device for determining safety which is an operating permission condition of the main device, which are connected on the network.

The network slave comprises means for performing a first operation for transmitting information including the data for maintenance of the safety determining device or both determination output of the safety determining device and data for maintenance of the safety determining device to the network master when a first request command is sent from the network master, and performing a second operation for transmitting information including the determination output of the safety determining device but not including the data for maintenance of the safety determining device at all or hardly including it to the network master when a second request command is sent from the network master.

A safety network system according to still another aspect of the present invention comprises a network master having charge of an operation of a main device and one or more network slaves each having charge of a safety determining device for determining safety which is an operating permission condition of the main device, which are connected on the network.

The network master comprises means for monitoring a determination output of each safety determining device through reception information from each network slave, and stopping the operation of the main device when danger is recognized based on the determination output of the safety determining device, and means for monitoring data for maintenance of each safety determining device through reception information from each network slave, and producing an output to the effect that necessity of maintenance is recognized in any safety determining device based on the data for maintenance of the safety determining devices.

Each network slave comprises means for selectively performing a first operation for transmitting information including the data for maintenance of the safety determining device or both determination output of the safety determining device and data for maintenance of the safety determining device to the network master, and a second operation for transmitting information including the determination output of the safety determining device but not including the data for maintenance of the safety determining device at all or hardly including it to the network master.

In addition, the first operation in the network slave is performed when a value of the data for maintenance of the relevant safety determining device is not more than a predetermined threshold value, and the second operation is performed when the value of the data for maintenance of the relevant safety determining device is more than the predetermined threshold value. In addition, when the data for maintenance of the safety determining device includes the plural kinds of data, respective threshold values are defined to the respective data, and when at least one data of the plural kinds of the data is more than the predetermined threshold value, the second operation is performed.

According to the above constitution, since the data for maintenance is transmitted on the network only when the maintenance is truly needed or necessity of the maintenance comes near, an amount of the data for maintenance in the transmission data is reduced as a whole and a transmission delay of the safety check data (determination output data) can be eliminated.

In the above description, the safety determining device may comprise a safety light curtain, a safety door switch or a safety limit switch. Here, the safety light curtain comprises a light emitting column containing a light emitter row in a case, and a light receiving column containing a light receiver row in the case, and these light emitting and receiving columns are arranged at an appropriate distance so that the light emitted and received surfaces are opposed to create a light curtain. The light axis of the light emitter and the light axis of the light receiver are arranged so as to coincide with each other without being overlapped, and the light emitters are sequentially lightened and only the light receiver having the light axis coinciding with the light performs a light reception signal operation.

Thus, since cross talk between the light emitter and the light receiver which have different light axes can be prevented, existence of an object which intruded in the light curtain can be surely detected regarding the whole light axes. For example, the safety light curtain is arranged around a dangerous device and stops the device when it detects someone's hand approaching.

In addition, the data for maintenance of the safety determining device may comprise data of the number of on-off times of an output, data of energized hours, data of past record of malfunction detection, time data of light shielded time or malfunction detected time and the like. In addition, date may be contained with the time in the data.

Still further, a time matching operation has been performed on a clock circuit of each network slave. Furthermore, the time matching operation in each network slave may be performed by a command from the network master.

When the light shielded time, the malfunction detected time or the like is transmitted from the slave to the master, if time in the slaves are different, confusion could be generated when the data is analyzed later. Therefore, it is preferable that the time matching has been previously performed between slaves by the command from the master.

DESCRIPTION OF THE PREFERRED EMBODIMENTS

Preferred embodiments of the present invention is described in detail with reference to the accompanying drawings hereinafter. In addition, it is needless to say that the present invention is not limited to the illustrated embodiments.

As described above, a safety network system according to the present invention comprises a network master having charge of an operation of a main device, one or more network slaves each having charge of a safety determining device for determining safety which is an operating permission condition of the main device, and the like which are connected on the network.

Figure 1:
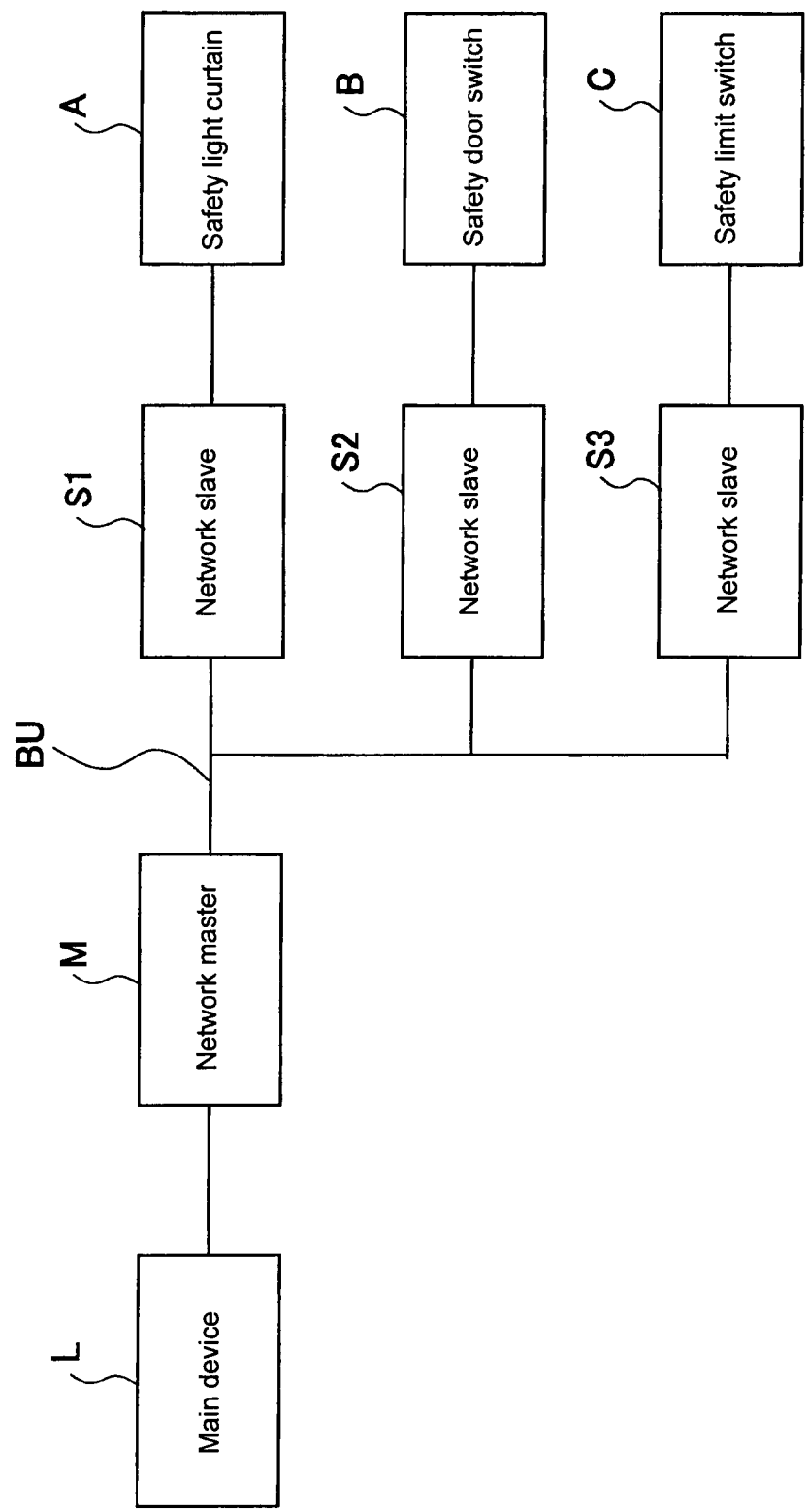
FIG. 1 shows a block diagram of a system according to the present invention.

FIG. 1 is a block diagram showing a system according to the present invention. As shown in FIG. 1, this safety network system comprises a network master M, and three network slaves S1 to S3 which are connected by a serial bus BU constituting the network.

The network master M has charge of an operation of a main device L. The main device L corresponds to a pressing machine or a machine tool or the like in which high operation safety is required.

Meanwhile, the three network slaves S1 to S3 have charge of safety determining devices for determining safety which is an operating permission condition. More specifically, the network slave S1, the network slave S2 and the network slave S3 have charge of a safety light curtain A as a safety determining device, a safety door switch B as a safety determining device and a safety limit switch C as a safety determining device, respectively.

The network master M has a function of monitoring a determination output of each of the safety determining devices (the safety light curtain A, the safety door switch B and the safety limit switch C) through reception information from each of the network slaves S1 to S3, and stopping the operation of the main device L when danger is recognized based on the determination outputs of the safety determining devices.

In addition, the network master M has a function of monitoring data for maintenance of each of the safety determining devices (the safety light curtain A, the safety door switch B and the safety limit switch C) through reception information from each of the network slaves S1 to S3, and producing an output to the effect that necessity of maintenance is recognized in any safety determining device based on the data for maintenance of the safety determining devices.

Here, the determination output of the safety determining device is as follows. In case of the safety light curtain A, it is turned on when a series of light receiving elements are all in a light receiving state and turned off when any light receiving element is in a light shielded state. Furthermore, in case of the safety door switch B, it is turned on when a door is closed and turned off when the door is opened. Still further, in case of the safety limit switch C, it is turned on when a moving object is positioned within tolerance and turned off when it is positioned without tolerance.

Meanwhile, the data for maintenance of the safety determining device is necessary when necessity of the maintenance is determined in any safety determining device. In case of the safety light curtain A, there are data of energized hours of light emitting and receiving elements, data of the number of on-off times of an output relay, data of past record of malfunction detection, time data of light shielded time or malfunction detected time and the like. Similarly, in case of the safety door switch B and in case of the safety limit switch C, there are data of energized hours and operating hours, data of the number of on-off times of the output, data of malfunction detected record, data of malfunction detected time and the like in various types of transducers employed in detection operations.

These data may be generated on the side of the safety determining devices (the safety light curtain A, the safety door switch B and the safety limit switch C), or a function of generating these data based on the outputs of the safety determining devices may be provided on the side of the network slaves S1 to S3.

In any case, each of the network slaves S1 to S3 responds to a transmission request command sent from the network master M through the serial bus BU, and transmits data for maintenance regarding each of the safety determining devices (the safety light curtain A, the safety door switch B and safety limit switch C) in charge to the network master M through the serial bus BU. In addition, a clock circuit is built in each of the network slaves S1 to S3. The clock circuits perform time matching operations with each other by a time matching command sent from the network master M. More specifically, such time matching operation is necessary because when the light shielded time, the malfunction detected time or the like is transmitted from the slave to the master, if the time in the slave is different from another, confusion is generated when the data is analyzed later.

Furthermore, each of the network slaves S1 to S3 has a function of selectively performing a first operation for transmitting information including both determination output of the safety determining device and data for maintenance of the safety determining device, to the network master M, and a second operation for transmitting information including the determination output of the safety determining device but not including the data for maintenance of the safety determining device at all or hardly including it, to the network master M.

Here, the terms of "not including at all or hardly including" means that a case where the data for maintenance is not included at all is included, of course and also a case where the data for maintenance is included a little is included. The term of "a little" is within a range of not disturbing a transmission delay time to be described later. When it is assumed that both determination output and data for maintenance are constantly transmitted to the network master M, the transmission time per cycle is increased. Thus, when danger is determined in any safety determining device, a delay is generated before the information is transmitted to the network master, causing operation switching responsibility until the main device L is stopped to be lowered. This lowering of responsibility causes considerable damage such as an accident resulting in physical injury.

Then, according to the system of the present invention, it is designed that the first operations in the network slaves S1 to S3 are performed when the main device L is in a stopped state, and the second operations in the network slaves S1 to S3 are performed when the main device L is in an operating state.

More specifically, the first operation for transmitting the information including both determination output of the safety determining device and data for maintenance of the safety determining device, to the network master M is performed when the main device is in the stopped state, and the second operation for transmitting information including the determination output of the safety determining device but not including the data for maintenance of the safety determining device at all or hardly including it, to the network master M is performed when the main device L is in the operating state.

According to the above constitution, since the first operation for transmitting the information including both determination output of the safety determining device and data for maintenance of the safety determining device, to the network master M is performed when the main device L is in the stopped state, even if danger determination is output in any safety determining device because human intrusion is detected or the like, the transmission delay does not matter because the main device L is in the stopped state at that time. Meanwhile, according to the content of the data for maintenance, since its change may be monitored by the several hours, the half day or the one day at most in many cases, it does not matter if the data for maintenance is obtained only when the main device is in the stopped state.

Figure 2:
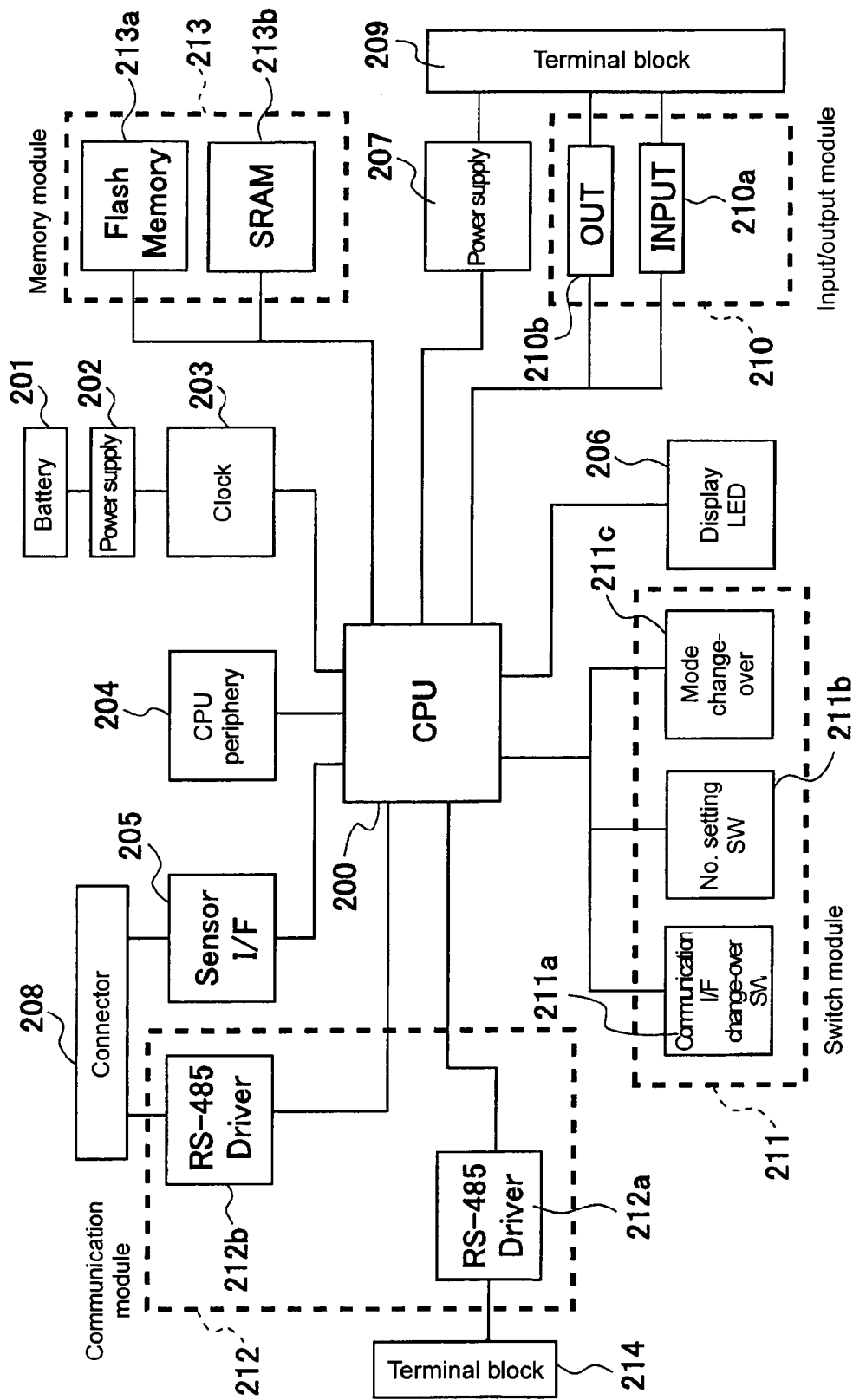
FIG. 2 shows a block diagram of a hardware constitution of a master (or a slave).

FIG. 2 shows a block diagram showing a hardware structure of the network master (or the network slave).

Referring to FIG. 2, reference numeral 200 designates a CPU for totally controlling the whole device, reference numeral 201 designates a battery for driving an electronic clock, reference numeral 202 designates a power supply having a backup battery function for driving the electronic clock, reference numeral 203 designates an electronic clock, reference numeral 204 designates a CPU peripheral circuit, reference numeral 205 designates a sensor interface, reference numeral 206 designates a display LED, reference numeral 207 designates a power supply for a terminal block, reference numeral 208 designates a connector, reference numeral 209 designates a terminal block, reference numeral 210 designates an input/output module, reference numeral 211 designates a switch module, reference numeral 212 designates a communication module, and reference numeral 213 designates a memory module.

An input interface 210a for inputting various signals from the outside through the terminal block 209, and an output interface 210b for outputting various signals to the terminal block 209 are provided in the input/output module 210.

A communication interface change-over switch 211a, a number setting switch 211b and mode change-over switch 211c are provided in the switch module 211 which is used in deciding the number of a baud rate or a master slave.

A RS-485 driver 212a for communicating with the network through the terminal block 214, and a RS-485 driver 212b for communicating with the main device, the sensor or the like through the connector 208 are provided in the communication module 212.

In addition, a flash memory 213a and an SRAM 213b are provided in the memory module 213.

The function as the network master and the function as the network slave can be switched by the mode change-over switch 211c. In addition, the switched state and various kinds of outputs to be described later are informed through the display LED 206.

When the device functions as the network master, the connector 208 is connected to the main device L. Meanwhile, when the device function as the network slave, the connector 208 is connected to any one of switches A to C constituting the safety determining devices. When the device functions as the network master, the main device L may be connected to the terminal clock 209.

The terminal block 214 is connected to the serial bus BU in either case where the relevant device is connected to the network master or the network slave.

An operation program of a microprocessor constituting the CPU 200 is stored in the memory module 213.

The terminal block 209 is used for outputting an alarm from the relevant device or giving various kinds of inputs to the relevant device.

Figure 3:
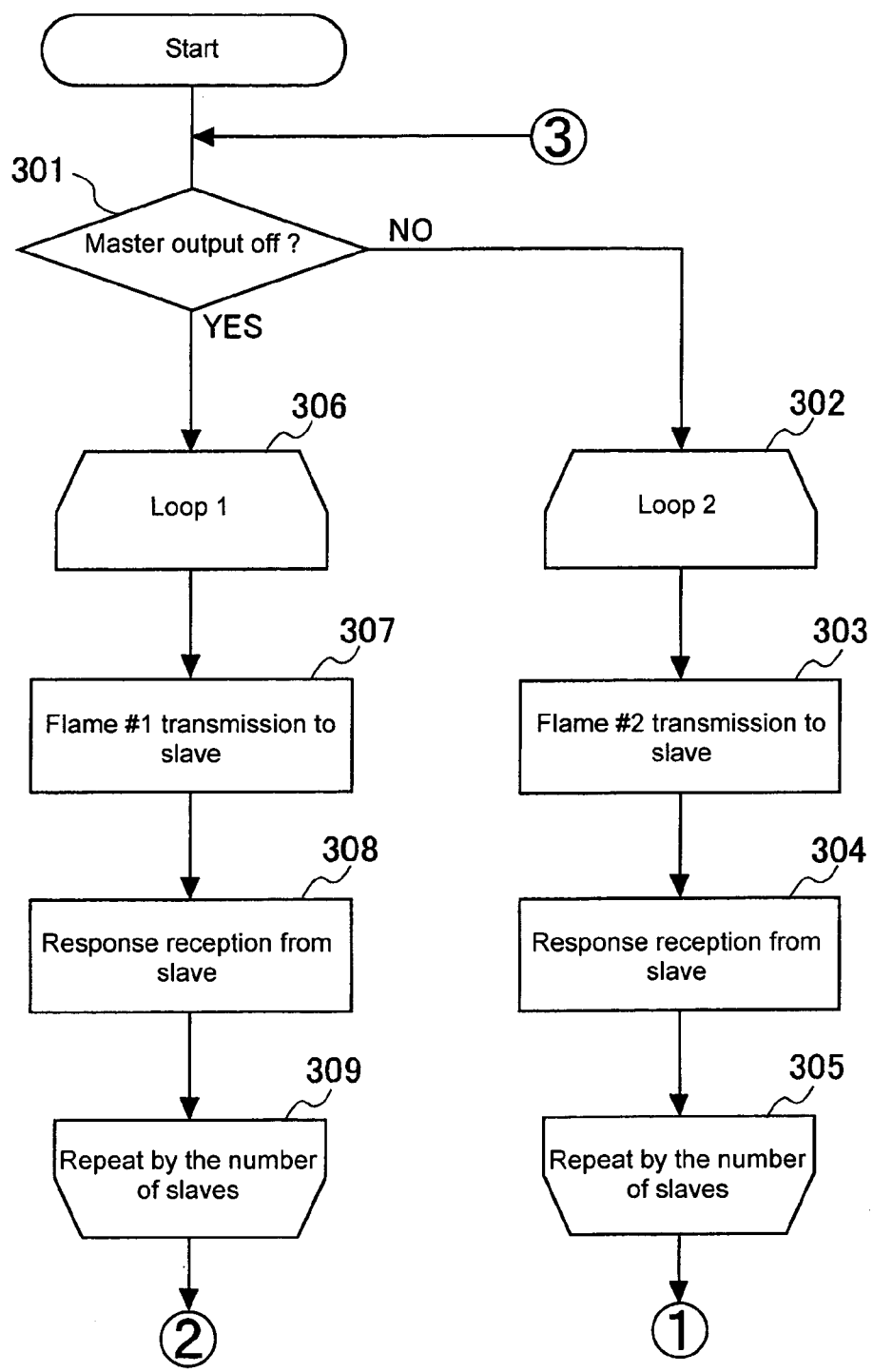
FIG. 3 shows a flowchart (1) of operations on the master side.
Figure 4:
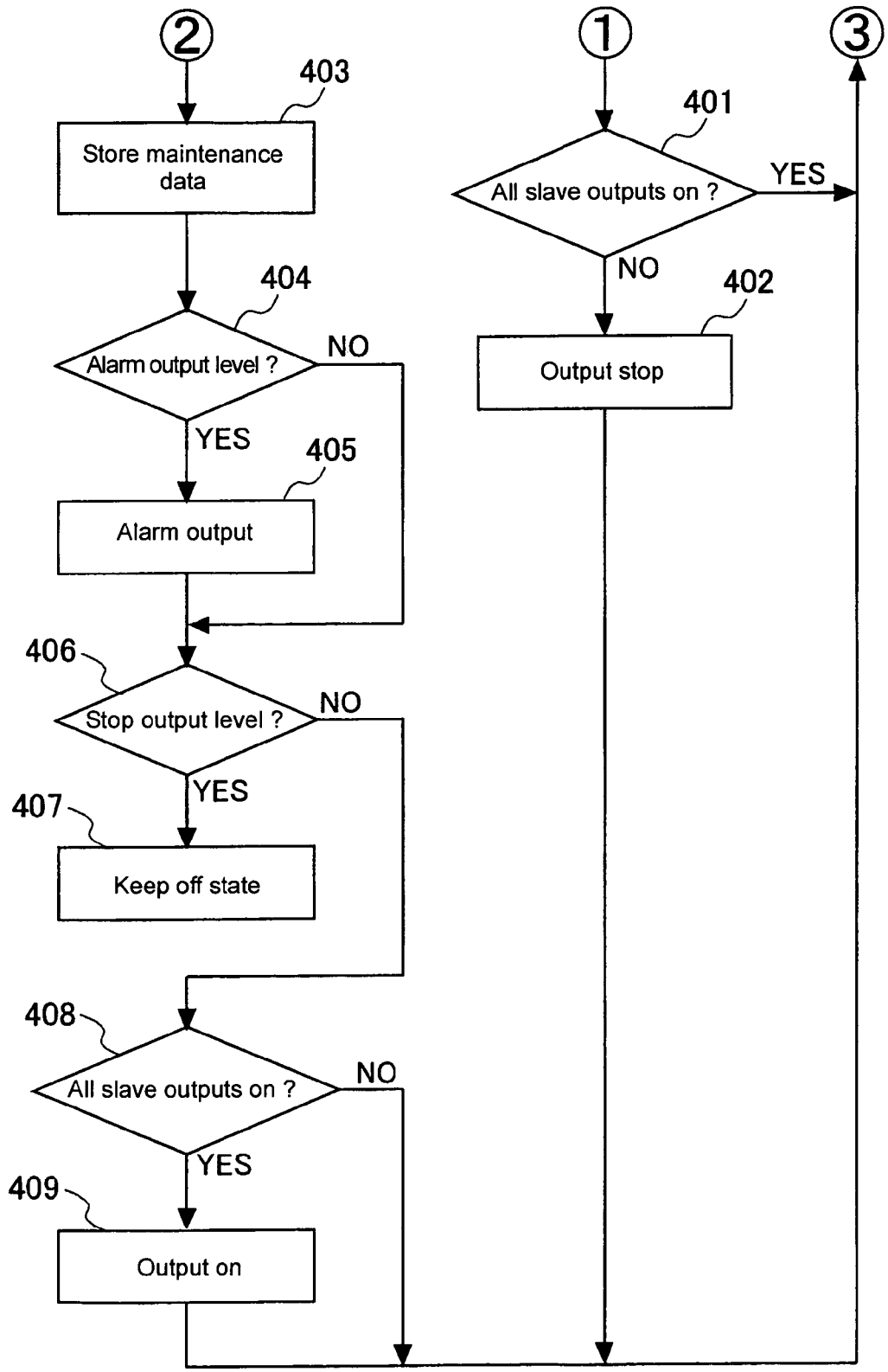
FIG. 4 shows a flowchart (2) of operations on the master side.
Figure 5:
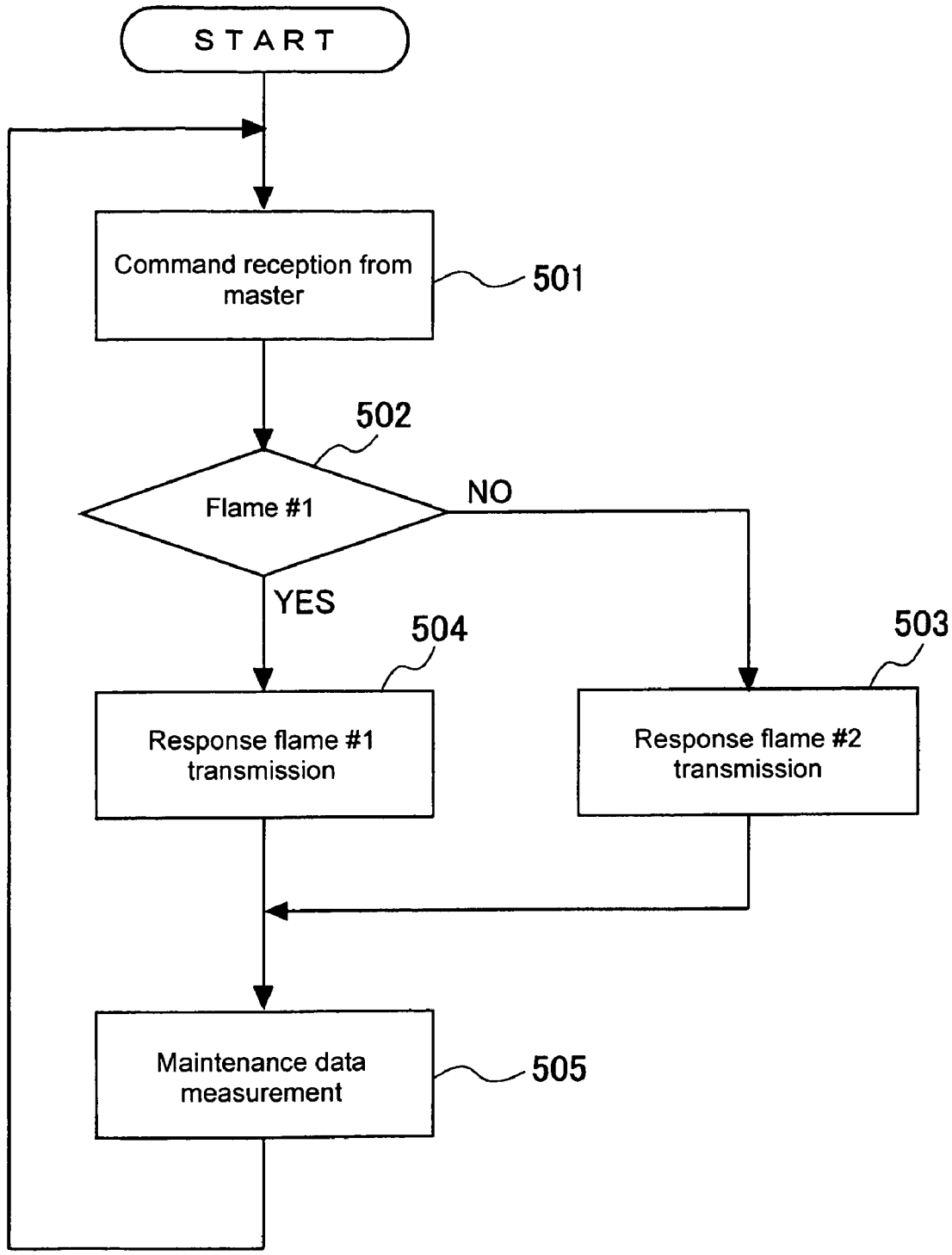
FIG. 5 shows a flowchart of operations on the slave side.

Then, FIGS. 3 to 5 show flowcharts showing operations of the network master and a flowchart showing operations of the network slave in the system constitution shown in FIG. 1.

Operations of the system according to the present invention are systematically described with reference to these flowcharts and time charts shown in FIGS. 6 to 8 hereinafter.

Two kinds of transmission request commands are prepared in the network master M. The first transmission request command is a command which requests to transmit information including both determination output of the safety determining device and data for maintenance of the safety determining device to the network master, which is described as "flame #1 transmission" in the flowchart in FIG. 3.

Meanwhile, the second command is a command which requests to transmit information including the determination output of the safety determining device but not including the data for maintenance of the safety determining device at all or hardly including it, to the network master, which is described as "flame#2 transmission" in the flowchart in FIG. 3.

Still further, in the flowcharts shown in FIGS. 3 to 5, the operating state of the main device L is already in an operating state after the power supply is turned on. In other words, the main device L is in the operating state when the output of the master is on, and the main device L is in the stopped state when the output of the master is off.

In this state, when the operation is started, it is determined that the output of the master is on, that is, "NO" at step 301 in the flowchart shown in FIG. 3 and then, transmission and reception operations using the second transmission request command are sequentially performed to each of the network slaves S1 to S3. More specifically, a second loop operation is started at step 302, and the second transmission request command is transmitted to the first network slave S1 at step 303, and a response reception operation from the first network slave S1 is performed at step 304. The above operations at steps 303 and 304 are sequentially repeated by the number of the network slaves connected to the network at step 305.

As a result, the determination outputs (on/off data) of the safety light curtain A, the safety door switch B and the safety limit switch C can be obtained from the first to third network slaves S1 to S3.

Then, the operation is moved to the flowchart shown in FIG. 4 and a determination whether a critical condition occurs in any safety determining device or not is made based on the on/off data from the safety light curtain A, the safety door switch B and the safety limit switch C at step 401.

When the critical condition has occurred in any safety determining device, the output of the network slave having charge of that safety determining device is turned off, and when the critical condition has not occurred, the output is turned on. Therefore, the fact that all outputs from the slaves are on means that the danger determination has not made in any one of the safety light curtain A, the safety door switch B and the safety limit switch C.

Then, when it is determined that all outputs of the slaves are on, that is, "YES" at step 401, the operation is returned to the flowchart shown in FIG. 3 and the above operations at steps 302 to 305 and step 401 are repeated.

In this state, when the danger determination is made in any safety determining device (A to C) because of the human intrusion or the like, the determination to the effect that any slave output is off is made, that is, "NO" at step 401 in the flowchart shown in FIG. 4, and the output of the master is immediately turned off so that the operation of the main device is switched from the operating state to the stopped state at step 402.

The important point here is that since the communication data on the network until the main device is stopped at step 402 consists of mainly the determination outputs (on/off data) of the safety determining devices (A to C), even when the outputs of the network slaves are cyclically transmitted, one transmission cycle time is short. Therefore, when the critical condition occurred in any safety determining device, this fact is immediately transmitted from the network slave to the network master, whereby the operation of the main device is immediately switched from the operating state to the stopped state and the accident resulting in physical injury can be prevented from occurring.

Meanwhile, according to the flowchart shown in FIG. 3 again, after the main device is switched from the operating state to the stopped state because of the danger determination, or after the main device is switched from the operating state to the stopped state by a manual input from the outside, since the output of the master is determined to be off, that is, "YES" at step 301, the first loop operation at steps 306 to 309 are performed hereinafter.

According to the first loop operations, operation of transmitting the first transmission request command to each of the network slaves and receiving its response are repeated for each of the network slaves S1 to S3 at steps 307 and 308.

As described above, the first transmission request command is the request to transmit the information including both determination outputs (on/off data) of the safety determining device and data for maintenance of the safety determining device (data of the number of on-off times, data of energized hours, data of malfunction detected record, time data such as light shielded time or malfunction detected time and the like), to the network master, when the first loop operations are completed, collection of data for maintenance from each network slave to the network master is completed.

Then, the operation is moved to the flowchart shown in FIG. 4, and the obtained data for maintenance is stored on the side of the network master at step 403 and then, various kinds of analyses are made for the maintenance data.

As a first analyzing operation, it is determined whether time when the maintenance is necessary comes near or not by comparing the respective data for maintenance with a defined predetermined threshold value. Here, it is determined that the maintenance time comes near as an "alarm output level" at step 404.

Here, when it is determined that the alarm output level is reached, that is, "YES" at step 404, an alarm output operation is carried out at step 405 and the fact that the maintenance time comes near in any safety determining device or which safety determining device needs maintenance is informed to the outside by lighting the display LED 206 shown in FIG. 2.

Then, as the next analyzing operation, analysis whether the maintenance time is really reached is made. According to the flowchart shown in FIG. 4, a determination operation whether the maintenance time has been reached already is shown as a "stop output level" at step 406 in the flowchart in FIG. 4.

Here, when it is determined that the stop output level is reached, that is, "YES" at step 406, the output of the network master is kept in the off state until the power supply is turned off at step 407.

More specifically, after the danger determination is made by any safety determining device, the main device in the network master is switched from the operating state to the stopped state according to the determination, and when it is determined that any safety determining device needs the maintenance based on the data for maintenance, that is, "YES" at step 406, an off-state keeping operation is performed at step 407. As a result, the operation of the main device L continues to be in the stopped state hereinafter.

Meanwhile, when neither the alarm output level nor the stop output lever is reached, that is, "NO" at step 404 and "NO" at step 406, it is determined whether all of the outputs of the salves is on or not at step 408. Here, the fact that all of the outputs of the slaves are on means that the danger determination is not made in any safety determining device. This means, for example that the human body left from the danger region, the safety door is closed or the operation of the safety limit switch is returned.

Here, when any slave output is off, that is, "NO" at step 408, the above operations at steps 301 to 309 and 403 to 408 are repeated. That is, since both on/off data of each safety determining device and data for maintenance of each safety determining device are exchanged on the serial bus constituting the network while the main device is in the stopped state, a cycle time of communication is elongated by just that much as compared with the case where the on/off data is only exchanged. However, in this state, since the main device L has been already in the stopped state, even if danger determination is made in another safety determining device, the main device L is not necessarily stopped again and the critical condition will not come on the system. On the contrary, in this state, since the data for maintenance constantly comes from each network slave to the network master, the operating condition of the safety determining device connected to each network slave can be accurately grasped on the side of the network master.

In addition, even while the main device L is stopped, it may not be necessary to constantly collect the data for maintenance every cycle in consideration of necessity for the data for maintenance. In that case, if it is during a period until the operating state is returned after the main device is switched from the operating state to the stopped state, even when the data for maintenance is intermittently or cyclically included in the series of on/off data, instead of mixing the data for maintenance into on/off data for a certain period at an early stage or into each on/off date, the operations are not disturbed.

In any case, since the operation for collecting the data for maintenance from each safety determining device is performed while the main device is stopped, even if the danger determination is suddenly output from another safety determining device in the meantime, which will not disturb the urgent interruption operation because the main device is in the stopped state at that time.

Furthermore, the switching of the transmission data corresponding to the above described transmission request command is performed on the side of the slave, and operations on the side of slave is described in detail in the flowchart in FIG. 5.

That is, referring to FIG. 5, when the operation is started, the transmission request command is received from the network master at step 501 and the kind of the transmission request command is determined at step 502.

Here, when it is determined that the transmission request command is the first transmission request command, that is, "YES" at step 502, the first operation in which the information including both determination output (on/off data) of the safety determining device and data for maintenance of the safety determining device (data of the number of on-off times of the output, data of energized hours or data of malfunction detected record or the like) is transmitted to the network master is performed at step 504.

Meanwhile, when it is determined that it is the second transmission request command, that is, "NO" at step 502, the second operation in which the information including the determination output of the safety determining device but not including the data for maintenance of the safety determining device at all or hardly including it is transmitted to the network master is performed at step 503.

Then, a measuring operation of the maintenance data is performed for the safety determining devices (A to C) under the charge of the network slaves at step 505. If data has bee already generated on the side of the safety determining device, an operation for obtaining that data is performed, or if only basic data is generated in the safety determining device, an operation for generating the maintenance data itself is performed based on the basic data.

As a result of repetition of the above operations, while the measuring operation of the maintenance data referring to the safety determining device in charge is performed on the side of the network slave at step 505, when the transmission request command is sent from the network master, the first operation is performed at step 504 or the second operation is performed at step 503 according to its kind so that the indicated data is returned to the network master.

Meanwhile, the switching between the first operation and the second operation in the network slave can be voluntarily performed by the network slave itself. Although there are various methods, as an example, the operations at steps 404 to 406 in the flowchart in FIG. 4 are performed on the side of the slave itself and when it is determined that the maintenance time comes near, the first operation may be performed to transmit the information including both determination output of the safety determining device and data for maintenance of the safety determining device is transmitted to the network master. Alternatively, when the maintenance time does not come near, the second operation may be performed to transmit the information not including the data for maintenance of the safety determining device at all or hardly including it, to the network master.

Although the above operations are not especially illustrated, those skilled in the art can easily understand them.

Figure 6:
FIG. 6 shows a time chart of procedures of communication between the master and slave according to the present invention.
Figure 6:
Figure 6:
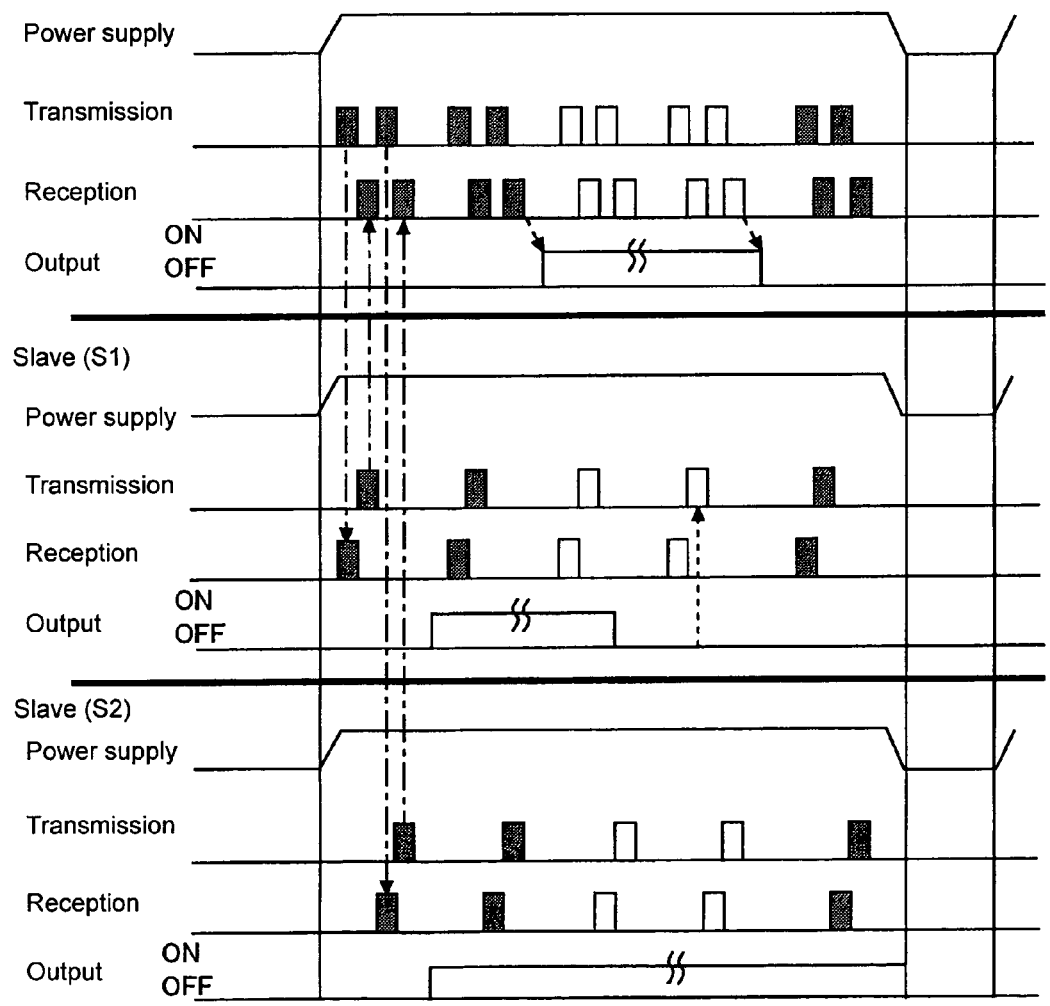
Figure 7:
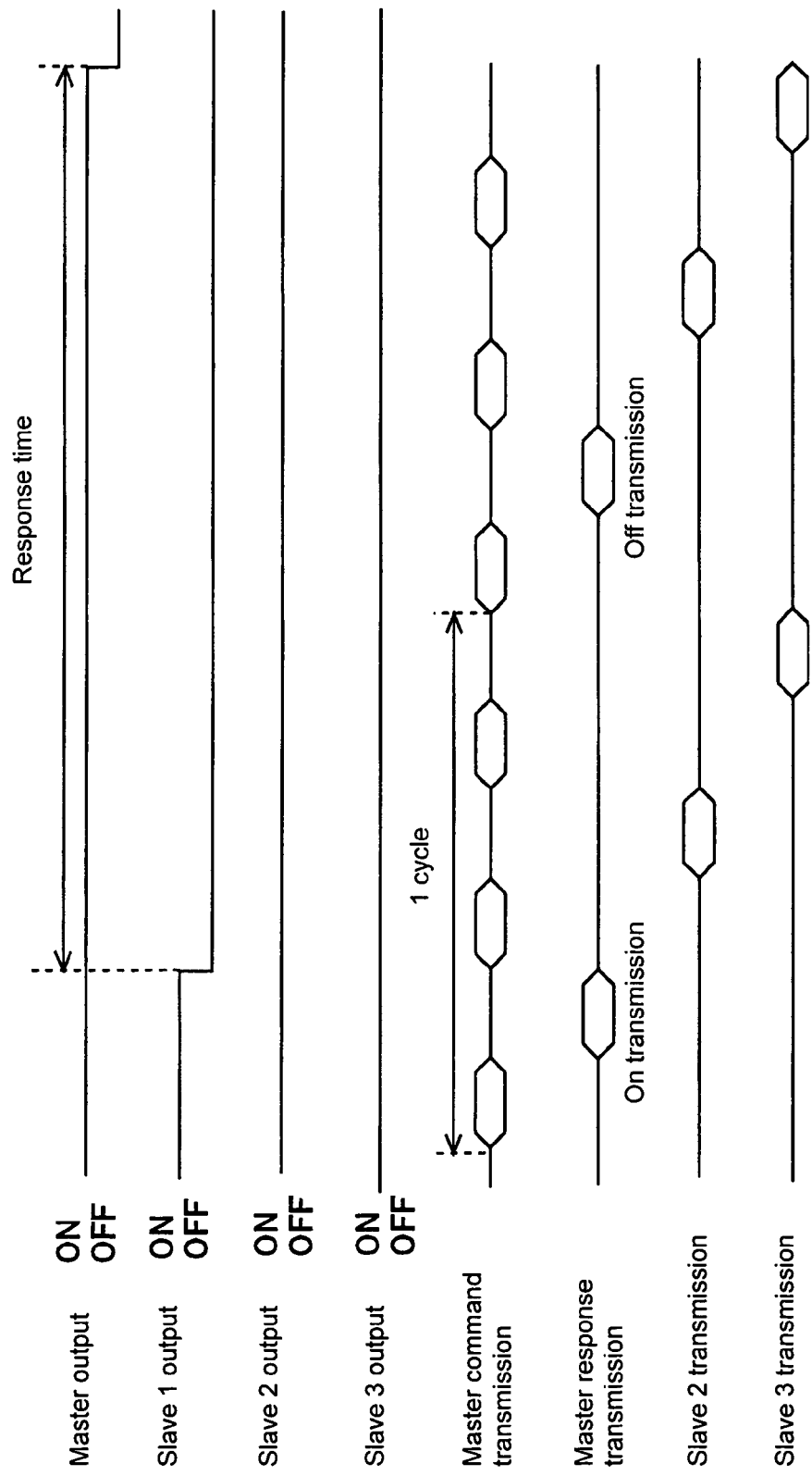
FIG. 7 shows an explanatory view of a comparative example of procedures of communication between the master and slave.
Figure 8:
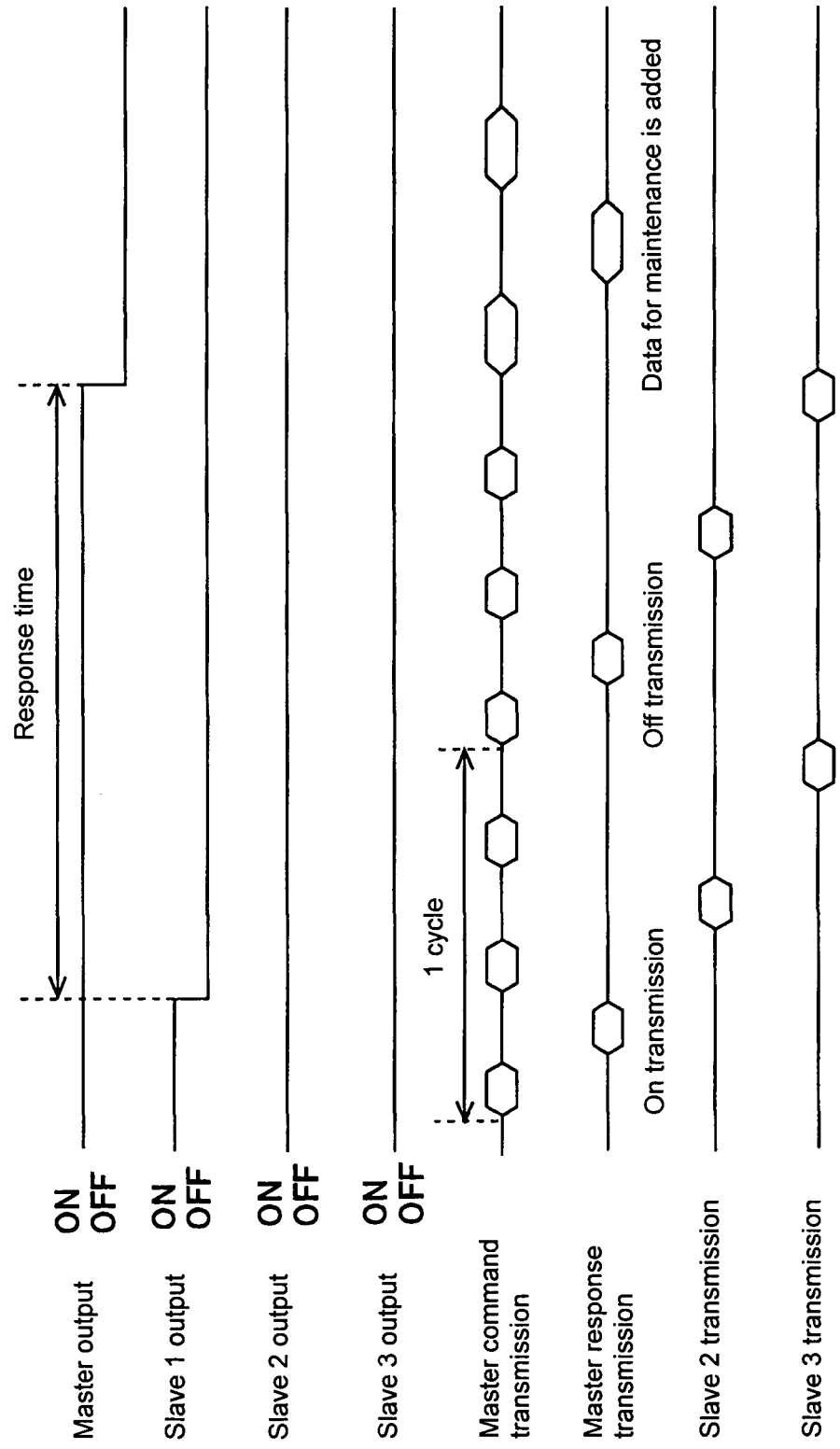
FIG. 8 shows a working example of procedures of communication between the master and slave.

Then, the communication operation between the network master and the network slave described above is visually described further with reference to the time charts shown in FIGS. 6 to 8.

The time chart for communicating procedures between the master and the slave according to the present invention, a comparison example of the communicating procedures between the master and the slave, and a working example of the communicating procedures between the master and the slave are shown in FIGS. 6, 7 and 8, respectively.

As can be clear from the time chart shown in FIG. 6, after the power supply of the system is turned on, during the period until the main device becomes the operating state (the output of the master is on), since the main device is still in the stopped state (the output of the master is off), the first transmission request command is transmitted to each of the slaves S1 and S2 immediately after the power supply is turned on and then, each of the slaves S1 and S2 returns both on/off data and data for maintenance.

Following to this state, when the main device is switched from the stopped state to the operating state (from the off state to the on state), the contents of the transmission command sent from the network master to the network slave becomes the second transmission request command. As a result, each network slave which received the transmission request command becomes the state of transmitting only the on/off data of the safety determination. In addition, in the drawing, the first transmission request command and its response are shown by shaded pulses, while the second transmission request command and its response are shown by outlined pulses.

Then, when the operation state of the main device is switched from the operating state (the output of the master is on) to the stopped state (the output of the master is off), there is provided again the state in which the first transmission request command and its response are transmitted.

According to the example shown in FIG. 6, when the danger determination is made in the safety determining device under the charge of the slave S1, the determination output is switched from the on state to the off state (danger detection state). Accordingly, the output of the slave S1 is switched from on to off. Then, as shown by arrows in the drawing, the data to the effect that is returned from the slave S1 to the master M a little later, and the operation state of the main device is instantaneously switched from the operating state to the stopped state.

In addition, according to the time chart shown in FIG. 6, although the state in which the first transmission request command and the response corresponding to it are transmitted and the state in which the second transmission request command and the response corresponding to it are transmitted are shown at almost the same time, this is because it is mainly intended that when the transmission request command is sent from the master side, this is received on the slave side and the danger determination operation happens to be performed at that time, the procedure in which the danger determination data is returned to the master side on that response is simply made to be clear.

Actually, there is a large difference in cycle time between the state in which the first transmission request command and the response corresponding to it are transmitted and the state in which the second transmission request command and the response corresponding to it are transmitted. This difference in cycle time is reflected to the response time and when the human body reaches the danger region or the like, the main device can be immediately cut off.

This is made to be further clear by the comparison example shown in FIG. 7 and the working example shown in FIG. 8. As shown in FIG. 7, when the determination output (on/off data) of the safety determining device and the data for maintenance of the safety determining device are constantly transmitted on the network, one cycle time of the communication and the response time is naturally forced to be elongated. Meanwhile, as shown by the time chart shown in FIG. 8, when the content of the communication data is differentiated depending on whether the main device is in the operating state or in the stopped state, and the information not including the data for maintenance of the safety determining device at all or hardly including it is transmitted when the main device in the stopped state especially, one cycle time is shortened because the data for maintenance is omitted. As a result, after the safety determining device determines the danger, a period (response time) until the master output is actually switched from the on state to the off state is considerably shortened.

Thus, according to the present invention, since the data for maintenance is transmitted when the main device is in the stopped state and the immediate cutoff operation is not necessary, when any safety determining device detects human body intrusion or the like and outputs danger determination, the response time while the main device is switched from the operating state to the stopped state is not lowered, and the fact that maintenance is necessary in the safety determining device of each network slave can be accurately recognized on the side of the network master.

Although as the first operation, the information including both determination output of the safety determining device and data for maintenance of the safety determining device is transmitted to the network master M in the above embodiment, only the data for maintenance of the safety determining device may be transmitted.

Figure 10:
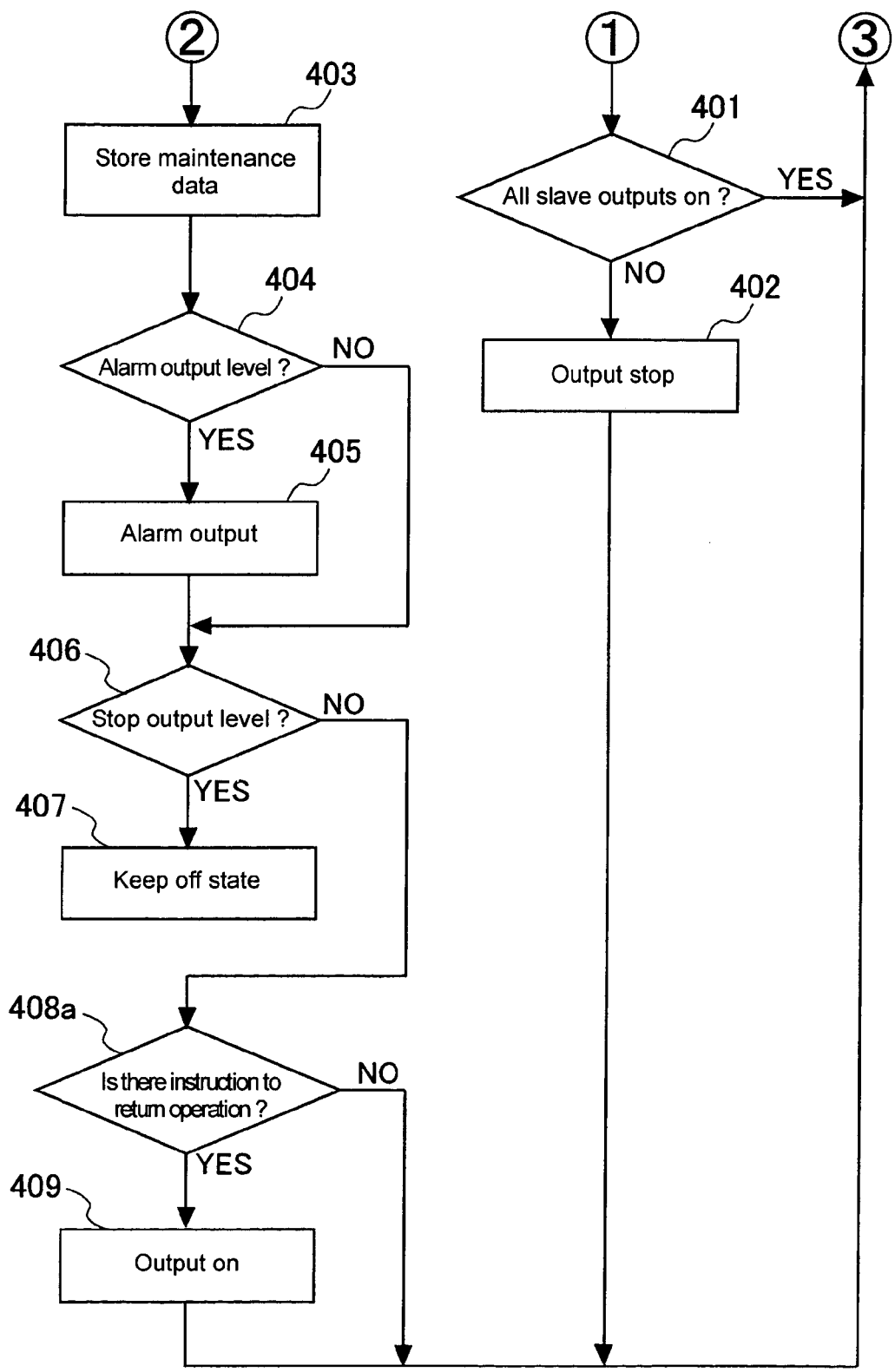
FIG. 10 shows a variation of the flowchart (2) of operations on the master side.

In this case, a flowchart (2) of the operations on the master side is shown in FIG. 10 corresponding to FIG. 4. FIG. 10 is different from FIG. 4 in that an instruction to return the operation is in a standby state at step 408a, the stopped state (output off) is maintained until the instruction is given, and when the instruction is given, the operation proceeds to step 409 and the device becomes in the operating state (output on). The instruction to return the operation may be given when a restart button connected to the network through the slave is pushed, or the main device L is restarted, or the safety determining device which made danger determination and output off receives a restart instruction. In addition, this operation flow may be used in the case where the information including both determination output of the safety determining device and data for maintenance of the safety determining device is transmitted to the network master M as the first operation.

The flowchart of the operations on the side of the network slave shown in FIG. 5 is as it is, in which when the transmission request command is determined to be the first transmission request command, that is, "YES" at step 502, the first operation is performed and data for maintenance of the safety determining device (data of the number of on-off times of the output, data of energized hours or data of malfunction detected record or the like) is transmitted from the relevant network slave to the network master.

Figure 9A:
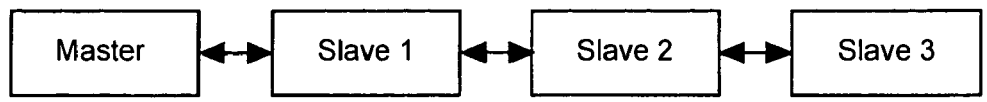
FIGS. 9A–9C show explanatory views of constitution examples other than a bus.
Figure 9B:
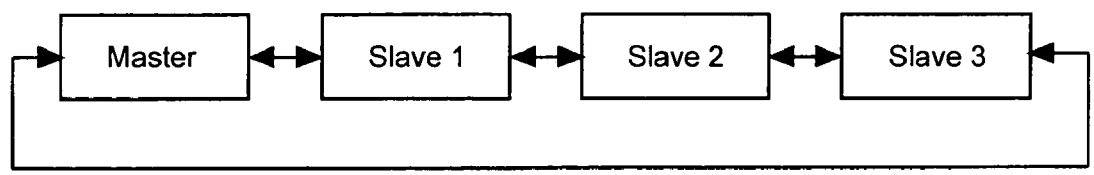
Figure 9C:
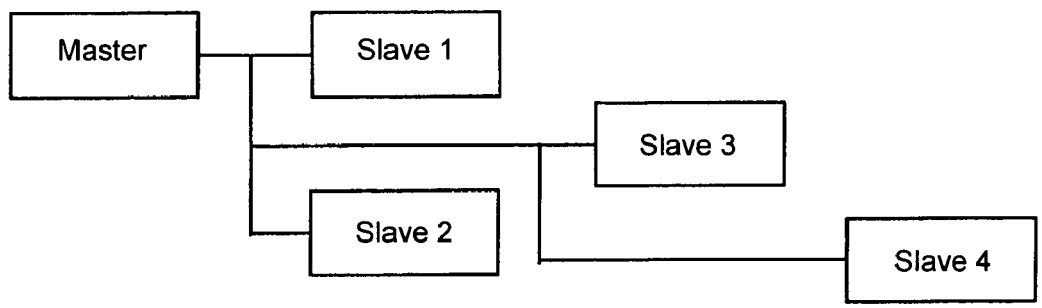

Although the bus connection was shown as one example of the network in the above embodiment, the present invention is not limited to this. For example, as shown in FIG. 9, the present invention can be applied to FIG. 9A daisy chain connection, FIG. 9B loop connection and FIG. 9C tree connection.

Furthermore, a time matching operation may have been previously performed on the clock circuit of each network slave. The time matching operation on each network slave may be performed by a command from the network master.

When light shielded time, malfunction detected time or the like is transmitted from the network slave to the network master, if time of each slave is different from another, confusion could be generated when the data is analyzed later. Therefore, it is preferable that time has been matched between slaves previously by the command from the master.

According to the present invention, when any safety determining device detects human body intrusion or the like and outputs danger determination, the response time while the main device is switched from the operating state to the stopped state is lowered, and the fact that maintenance is necessary in the safety determining device of each network slave can be accurately recognized on the side of the network master.

What is claimed is:

1. A safety network system comprising a network master having charge of an operation of a main device and one or more network slaves each having charge of a safety determining device for determining safety which is an operating permission condition of the main device, which are connected on the network, wherein the network master comprises:
   means for monitoring a determination output of each safety determining device through reception information from each network slave, and stopping the operation of the main device when danger is recognized based on the determination output of the safety determining device; and
   means for monitoring data for maintenance of each safety determining device through reception information from each network slave, and producing an output to the effect that necessity of maintenance is recognized in any safety determining device based on the data for maintenance of the safety determining device,
   each network slave comprises means for selectively performing a first operation for transmitting information including the data for maintenance of the safety determining device or both determination output of the safety determining device and data for maintenance of the safety determining device to the network master; and
   a second operation for transmitting information including the determination output of the safety determining device but not including the data for maintenance of the safety determining device at all or hardly including it to the network master, and
   the first operation in the network slave is performed when the main device is in a stopped state and the second operation in the network slave is performed when the main device is in an operating state.

2. The safety network system according to claim 1, wherein the safety determining device comprises a safety light curtain, a safety door switch or a safety limit switch.

3. The safety network system according to claim 1, wherein the data for maintenance of the safety determining device comprises data of the number of on-off times of an output, data of energized hours, data of past record of malfunction detection, time data of light shielded time or malfunction detected time and the like.

4. The safety network system according to claim 1, wherein a time matching operation has been performed on a clock circuit of each network slave.

5. The safety network system according to claim 4, wherein the time matching operation in each network slave is performed by a command from the network master.

6. A safety network system comprising a network master having charge of an operation of a main device and one or more network slaves each having charge of a safety determining device for determining safety which is an operating permission condition of the main device, which are connected on the network, wherein the network master comprises:
   means for monitoring a determination output of each safety determining device through reception information from each network slave, and stopping the operation of the main device when danger is recognized based on the determination output of the safety determining device; and
   means for monitoring data for maintenance of each safety determining device through reception information from each network slave, and producing an output to the effect that necessity of maintenance is recognized in any safety determining device based on the data for maintenance of the safety determining devices,
   each network slave comprises means for selectively performing a first operation for transmitting information including the data for maintenance of the safety determining device or both determination output of the safety determining device and data for maintenance of the safety determining device to the network master; and
   a second operation for transmitting information including the determination output of the safety determining device but not including the data for maintenance of the safety determining device at all or hardly including it to the network master, and
   selection between the first operation and second operation in each network slave is controlled depending on the content of a transmission request command sent from the network master.

7. The safety network system according to claim 6, wherein the network master transmits the transmission request command corresponding to the second operation to each network slave when the main device is in the operating state, and transmits the transmission request command corresponding to the first operation to each network slave when the main device is in the stopped state.

8. The safety network system according to claim 6, wherein the safety determining device comprises a safety light curtain, a safety door switch or a safety limit switch.

9. The safety network system according to claim 6, wherein the data for maintenance of the safety determining device comprises data of the number of on-off times of an output, data of energized hours, data of past record of malfunction detection, time data of light shielded time or malfunction detected time and the like.

10. The safety network system according to claim 6, wherein a time matching operation has been performed on a clock circuit of each network slave.

11. A network master used in a safety network system comprising a network master having charge of an operation of a main device and one or more network slaves each having charge of a safety determining device for determining safety which is an operating permission condition of the main device, which are connected on the network, comprising:

- means for monitoring a determination output of each safety determining device through reception information from each network slave, and stopping the operation of the main device when danger is recognized based on the determination output of the safety determining device;
- means for monitoring data for maintenance of each safety determining device through reception information from each network slave, and producing an output to the effect that necessity of maintenance is recognized in any safety determining device based on the data for maintenance of the safety determining device; and
- means for transmitting a transmission request command corresponding to a first operation for transmitting information including the data for maintenance of the safety determining device or both determination output of the safety determining device and data for maintenance of the safety determining device to each network slave when the main device is in a stopped state, and transmitting a transmission request command corresponding to a second operation for transmitting information including the determination output of the safety determining device but not including the data for maintenance of the safety determining device at all or hardly including it to each network slave when the main device is in an operating state.

12. A network slave used in a safety network system comprising a network master having charge of an operation of a main device and one or more network slaves each having charge of a safety determining device for determining safety which is an operating permission condition of the main device, which are connected on the network, characterized by comprising means for performing a first operation for transmitting information including the data for maintenance of the safety determining device or both determination output of the safety determining device and data for maintenance of the safety determining device to the network master when a first request command is sent from the network master, and performing a second operation for transmitting information including the determination output of the safety determining device but not including the data for maintenance of the safety determining device at all or hardly including it to the network master when a second request command is sent from the network master.

13. A safety network system comprising a network master having charge of an operation of a main device and one or more network slaves each having charge of a safety determining device for determining safety which is an operating permission condition of the main device, which are connected on the network, wherein the network master comprises:

- means for monitoring a determination output of each safety determining device through reception information from each network slave, and stopping the operation of the main device when danger is recognized based on the determination output of the safety determining device; and
- means for monitoring data for maintenance of each safety determining device through reception information from each network slave, and producing an output to the effect that necessity of maintenance is recognized in any safety determining device based on the data for maintenance of the safety determining device,
- each network slave comprises means for selectively performing a first operation for transmitting information including the data for maintenance of the safety determining device or both determination output of the safety determining device and data for maintenance of the safety determining device to the network master; and
- a second operation for transmitting information including the determination output of the safety determining device but not including the data for maintenance of the safety determining device at all or hardly including it to the network master, and
- the first operation in the network slave is performed when a value of the data for maintenance of the relevant safety determining device is not more than a predetermined threshold value, and the second operation is performed when the value of the data for maintenance of the relevant safety determining device is more than the predetermined threshold value.

* * * * *